United States Patent [19]
Wicks

[11] Patent Number: 5,889,473
[45] Date of Patent: Mar. 30, 1999

[54] TOURIST INFORMATION PAGER

[75] Inventor: James E. Wicks, San Francisco, Calif.

[73] Assignees: Sony Corporation, Tokyo, Japan; Sony Electronics, Inc., Park Ridge, N.J.

[21] Appl. No.: 819,385

[22] Filed: Mar. 17, 1997

[51] Int. Cl.⁶ .................................................. G08B 5/22
[52] U.S. Cl. .............................. 340/825.44; 340/825.47
[58] Field of Search ....................... 340/825.44, 825.52, 340/825.47, 825.07, 825.05, 825.39, 988, 995; 455/70, 54.2, 88, 186.1; 364/705.05, 946.2, 948.21, 963.3, 513.5, 419, 900

[56] References Cited

U.S. PATENT DOCUMENTS

| | | | |
|---|---|---|---|
| 4,415,065 | 11/1983 | Sandstedt | 186/39 |
| 4,951,039 | 8/1990 | Schwendeman et al. | 340/725 |
| 4,984,177 | 1/1991 | Rondel et al. | 364/513.5 |
| 5,173,688 | 12/1992 | DeLuca et al. | 340/825.44 |
| 5,182,553 | 1/1993 | Kung | 340/825.44 |
| 5,214,793 | 5/1993 | Conway et al. | 340/825.39 |
| 5,331,431 | 7/1994 | Jasinski | 358/462 |
| 5,446,678 | 8/1995 | Saltzstein et al. | 364/514 R |
| 5,452,356 | 9/1995 | Albert | 380/9 |
| 5,481,255 | 1/1996 | Albert et al. | 340/825.55 |
| 5,491,785 | 2/1996 | Robson et al. | 395/162 |
| 5,495,344 | 2/1996 | Callaway, Jr. et al. | 358/407 |
| 5,508,695 | 4/1996 | Nelson et al. | 340/825.37 |
| 5,512,886 | 4/1996 | Macko et al. | 340/825.44 |
| 5,535,428 | 7/1996 | King et al. | 455/38.4 |
| 5,539,395 | 7/1996 | Buss et al. | 340/825.44 |
| 5,555,446 | 9/1996 | Jasinski | 340/825.44 |
| 5,635,918 | 6/1997 | Tett | 340/825.52 |

Primary Examiner—Michael Horabik
Assistant Examiner—Jean B. Jeanglaude
Attorney, Agent, or Firm—Ronald P. Kananen

[57] ABSTRACT

A pager and two-way paging system may be provided which allow the pager user to send a request for tourist information. The system identifies the general location of the pager user and compiles tourist information such as historical data or trivia about the area which is transmitted to the pager user. The transmissions may take the pager user on a walking tour of the area. The pager may also include a language cartridge for translating the tourist information into another language. The pager may also include a map cartridge with which the pager can display a map of the immediate vicinity for the pager user.

11 Claims, 5 Drawing Sheets

TOURIST INFORMATION PAGER

FIELD OF THE INVENTION

The present invention relates generally to the field of wireless pagers. More particularly, the present invention relates to the application of wireless pager technology to the task of providing information for tourists and business travelers unfamiliar with an area.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information and communication demands of pager users.

Improved means of communications, such as pagers and paging technology, are necessary in modern society, in part, because society is increasingly mobile. Travel for both business and recreation is common and increasing with the advent of a truly global economy. Consequently, travelers may often find themselves in an unfamiliar locale and be in need of directions or information about the area. Accordingly, there is need for a means of providing such information to travelers in such a manner that the information is specific and readily available when needed.

SUMMARY OF THE INVENTION

It is an object of the present invention to meet the above-identified needs and others. Particularly, it is an object of the present invention to provide a pager technology in which a pager user can use a pager to receive directions or other tourist information while in an unfamiliar area.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a pager having: a display; a controller; an antenna for transmitting to and receiving transmissions from a paging system; and means to generate a request for tourist information which may be transmitted to the paging system. The means to generate a request for tourist information may include: an icon displayed on the display; an input device for moving a cursor on the display and for selecting a displayed item which is highlighted by the cursor. The request for tourist information is transmitted in response to a selection of the icon.

The pager of the present invention may further include a cartridge port and a language and/or map cartridge connected to the controller through the cartridge port. A language cartridge would be programmed with language information for translating transmissions received from the paging system. A map cartridge would be programmed with map data which may be displayed on the display.

The present invention may further encompass a paging system having: at least one base station for receiving transmissions from a pager; at least one base station for transmitting transmissions to a pager; means for determining an approximate location of a pager; and a central processor for compiling tourist information specific to the location. The tourist information is transmitted to the pager by the paging system.

The paging system of the present invention may compile tourist information which includes an indication of a map to be retrieved from a cartridge of the pager and displayed on a display of the pager.

The present invention also encompasses a method of using a pager and paging system including the steps of: receiving with the paging system a request from the pager for tourist information; determining an approximate location of the pager; preparing tourist information specific to that location; and transmitting the specific information to the pager. The specific information comprises a list of tourist attractions at the pager's location.

The method of the present invention may further include the steps of: receiving from the pager a selection from among the list of tourist attractions; and transmitting information about the selected attraction to the pager. The method may continue by: receiving from the pager a selection from among the list of tourist attractions; and transmitting directions from the selected attraction to another of the listed attractions.

The method may also continue by translating the tourist information into another language. If the tourist information comprises an indication of a map of the pager's location, the method may continue with the step of transmitting the indication to the pager.

The present invention also encompasses a method of using a pager comprising the steps of: displaying information with a display disposed on the pager; controlling the pager with a controller disposed in the pager; transmitting and receiving transmissions with an antenna disposed on the pager; generating a request for tourist information with the pager; and transmitting the request to a paging system.

The present method may continue with the steps of: displaying an icon with the display; moving a cursor on the display with an input device of the pager; selecting a displayed item which is highlighted by the cursor with the input device; and transmitting a request for tourist information with the pager in response to a selection of the icon.

The present method may also include the step of providing a cartridge port on the pager. The cartridge port may be used by: connecting a language cartridge to the controller through the cartridge port; and translating transmissions received from the paging system using programming in the language cartridge. Also, the cartridge port may be used by: connecting a map cartridge to the controller through the cartridge port; receiving an indication transmitted by the paging system indicating a particular map stored electronically in the cartridge; retrieving the indicated map from the map cartridge; and displaying the map with the pager.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Figure 1:
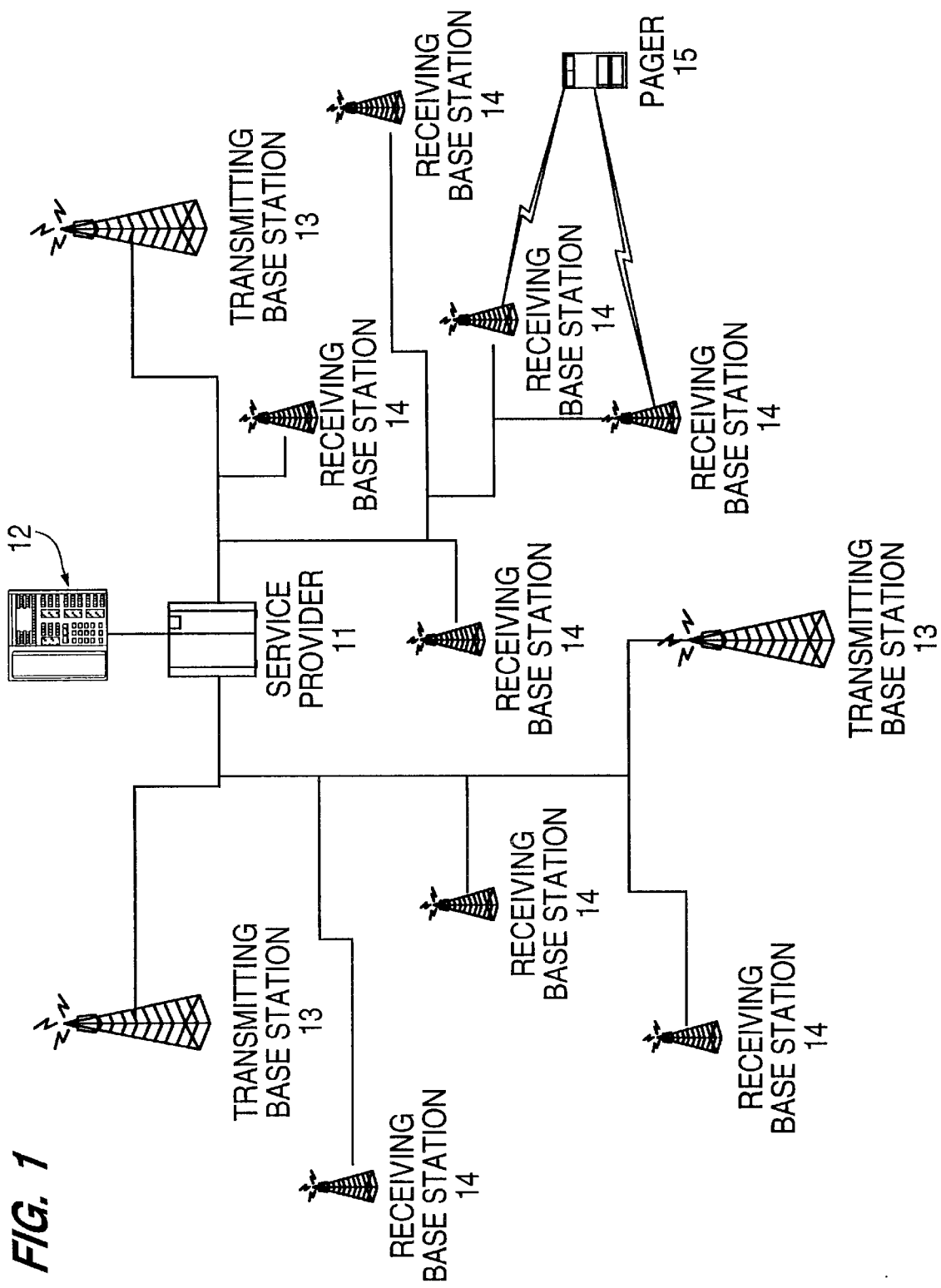
FIG. 1 is a schematic diagram of a conventional two-way paging network with which the present invention may be practiced.

Using the drawings, the preferred embodiment of the present invention will now be explained.

As described, a pager on a two-way paging system has the capability to transmit messages to the system. In a first embodiment of the present invention, a pager user wishes to use his or her pager to receive information, perhaps in the form of a walking tour, about an unfamiliar area. The pager user accordingly uses a pager to send a request to the local paging system for tourist information. The local service provider may, under an agreement with the pager user or the pager user's home service provider, charge the pager user a fee for this service.

The user's pager may have a dedicated button which, when pushed, sends a request for tourist information to the service provider. Particularly, this may be true if the pager is rented by the local service provider for the primary purpose of paging tourist information to the user. However, in the preferred embodiment, illustrated in FIG. 2, the user's pager 21 includes a liquid crystal display 24. On the display 24, the user will find an icon 25 which, when selected, sends the request to the service provider for tourist information.

To select the icon, the pager is provided with buttons 23 for moving a cursor (not shown) on display 24. When the cursor is highlighting the icon 25, the user pushes the select button 22. The user's pager may be programmed with this feature by the service provider when the contract between the service provider and the pager user is set up and the pager user indicates a desire for the tourist information service.

In the preferred embodiment, after the request for tourist information is sent, the service provider's system may determine the general location of the pager user. With reference to FIG. 1, the method of determining the general location of a pager 15 using a two-way paging network will be briefly described.

Because the strength of a transmission from a pager 15 is tightly constrained by the battery power available to the pager, a two-way paging system must include a greater number of receiving base stations 14 than transmitting base stations 13. The receiving base stations 14 are smaller and distributed more widely that transmitting base stations 13 in order to receive the relatively weak transmissions broadcast by individual pagers 15. The receiving base stations 14 must be sufficient in number and distribution to receive pager transmissions originating anywhere in the service area.

In a two-way paging system, a transmission from a pager 15 may be received by one or more receiving base stations 14. By determining which base station 14 is receiving the pager signal or, if more than one base station is receiving the pager signal, which base station is receiving the stronger signal, the general location of the pager 15 and, thus, the pager user can be determined. This is based on the generally true principle that the base station 14 receiving the strongest signal from the pager 15 is geographically closest to that pager.

Figure 4:
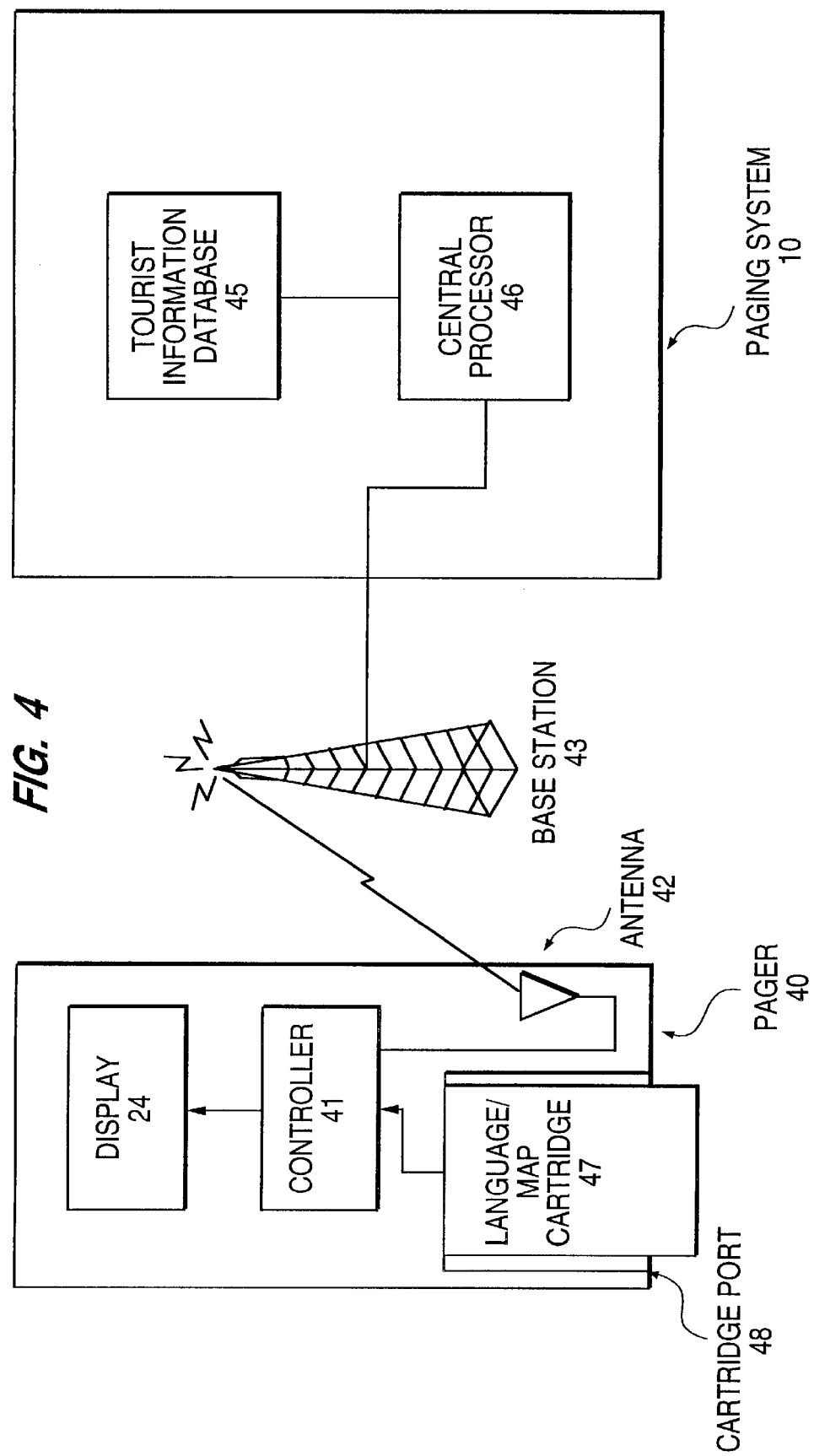
FIG. 4 is a diagram of the components of the pager and paging system according to the present invention.

As shown in FIG. 4, the service provider compiles tourist information comprising, for example, walking tours of particular geographic areas and the major attractions within each area from which a pager user may wish to commence a tour. This information is compiled in a database 34 which is part of the paging system 10.

Trough base station 43, a central processing unit 35 of the paging system 10 receives the request for tourist information transmitted by pager 15. Having received the request, the central processing unit 35 can determine the general location of the pager 15 using the method described above. The central processing unit may then review the compiled tourist information in database 34 to identify information specific to the pager's determined location.

The pager 15 is provided with an antenna 32 with which to transmit requests to and receive transmissions from the paging system 10. Using antenna 32, transmissions of tourist information from paging system 10 are received by a controller 31 of pager 15. The controller 31 drives display 24 to display the transmitted information for the pager user.

Figure 2:
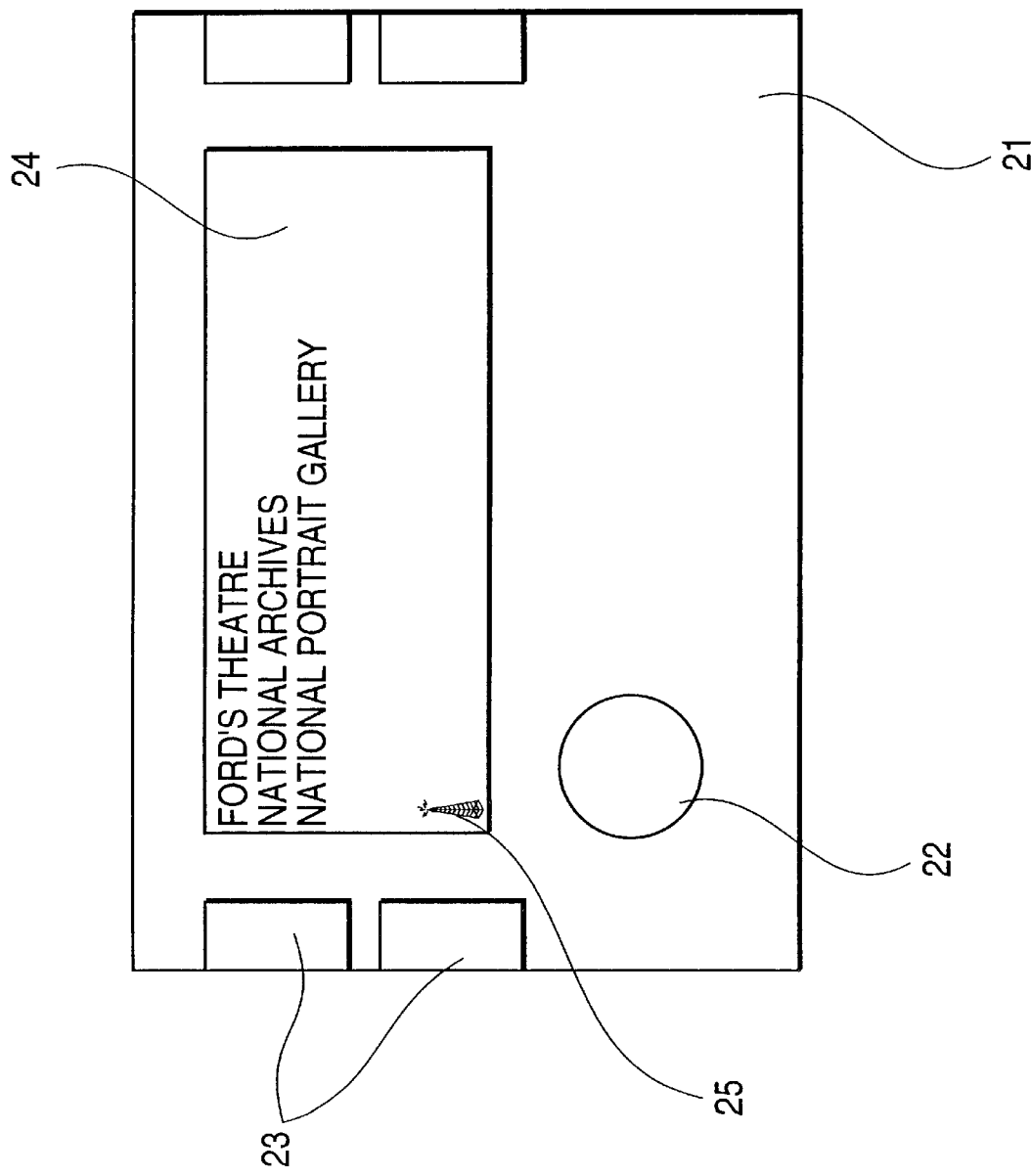
FIG. 2 is a diagram of a pager according to the principles of the present invention.

Under the principles of the present invention, after determining the general location of the pager, as shown in FIG. 2, the paging system 10 may transmit to the pager a short list of significant tourist attractions in the pager user's vicinity about which the pager user may wish more information or from which the pager user may wish to initiate a walking tour.

Figure 3:
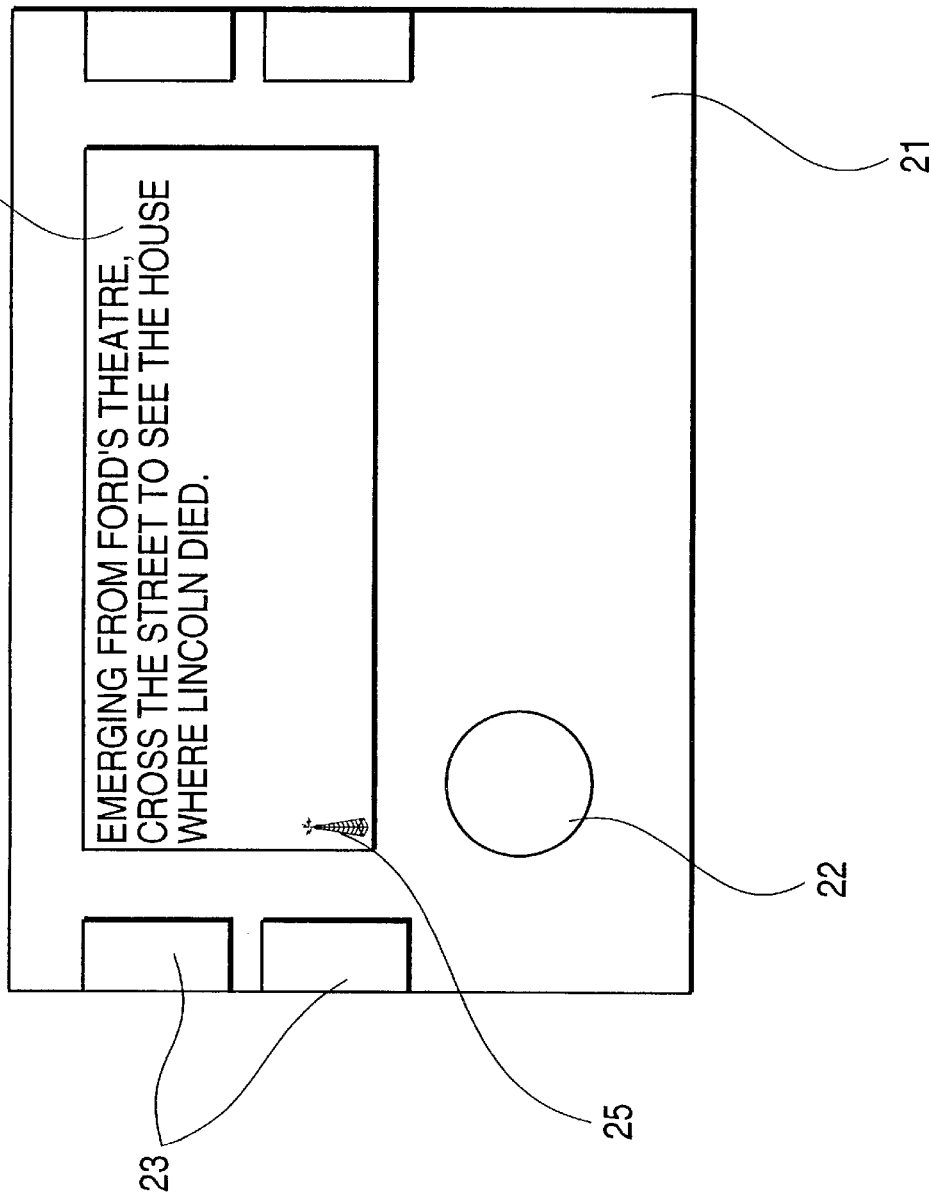
FIG. 3 is a diagram of a pager according to the principles of the present invention.

To commence a walking tour, the pager user locates one of the attractions on the list, and highlights and selects that attraction in the manner described above. The service provider may then transmit interesting trivia or historical information about the attraction the user has selected. When the user has finished exploring the first attraction, to his or her satisfaction, the user may again select the transmit icon 25. As shown in FIG. 3, the paging system then continues the walking tour by transmitting directions to the next attraction on the tour. The directions are received and displayed by the user's pager.

In this manner, the pager user may, beginning from any of the major attractions initially listed, start a walking tour of an unfamiliar area. The user is then guided through the area, informed about the sights and attractions at his or her own pace. The tour continues until the user has visited all the tour attractions or discontinues the tour.

Turning again to FIG. 4, the present invention may also be adapted to accommodate tourists from a variety of countries who speak different languages. The pager 40 of FIG. 4 may be rented to the pager user by a hotel, airline, or travel agency that is hosting the user. Pager 40 is provided with a cartridge port 48 into which a language cartridge 47 is inserted.

The language cartridge 47 is programmed to translate the previously prepared instructions and options of the walking tour transmitted by the paging system 10 into the native language of the pager user. Controller 41 receives the transmission via antenna 42, uses the information in cartridge 47 to translate the message of the transmission, and displays the translated message on display 24.

In the alternative, the translation may by performed by the central processor 46 of the paging system 10. However, this requires some communication between the paging system 10 and the party renting or providing the pager 40 to foreign tourists.

Figure 5:
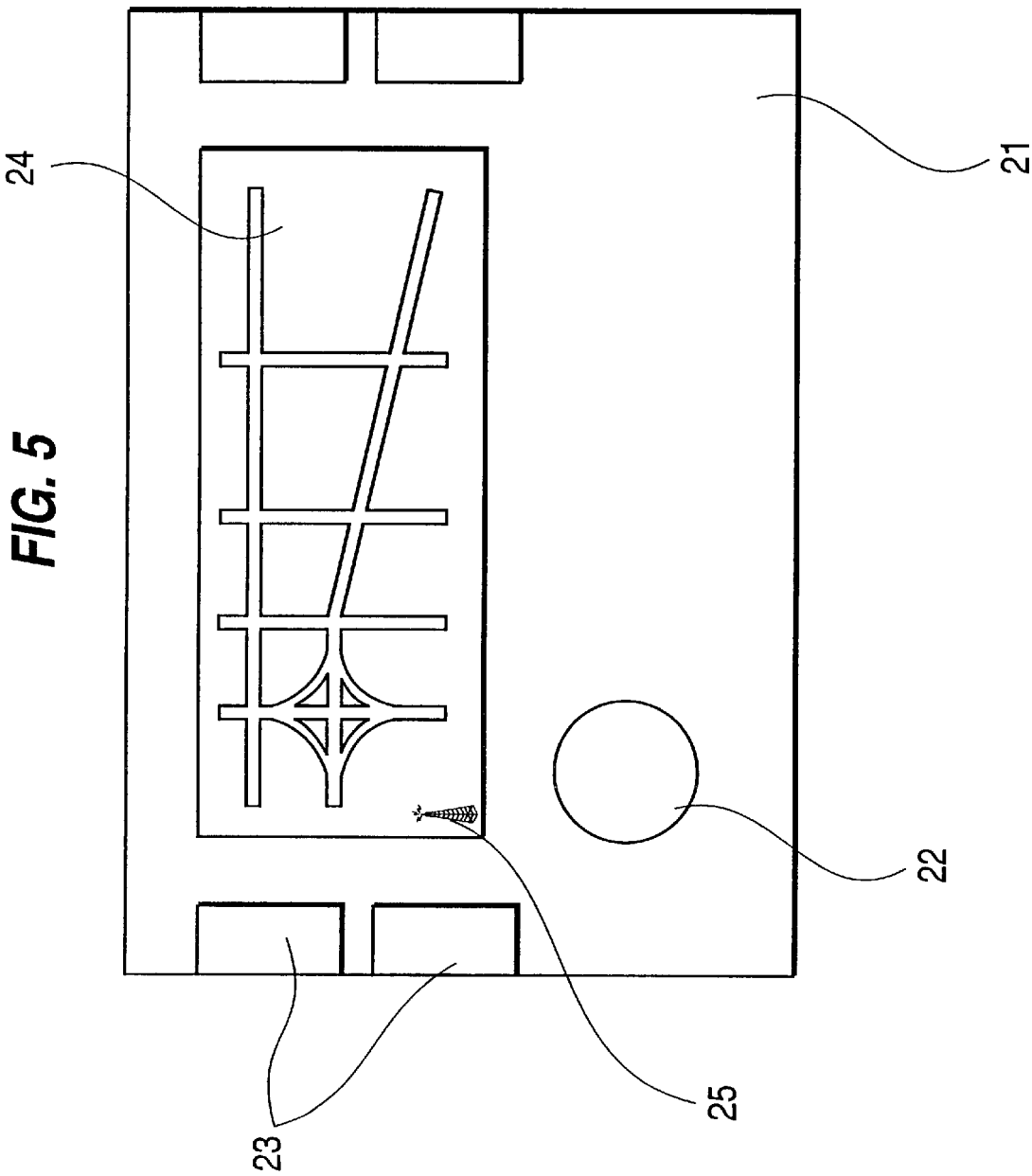
FIG. 5 is a diagram of a pager according to the principles of the present invention.

Finally, the cartridge 47 shown in FIG. 4 may also contain map information, in addition to or as an alternative to the foreign language information. If cartridge 47 contains map information, the central processor 46 may determine the location of the pager using the method described above and then indicate that location to the controller 41. This indication will enable the controller 41 to retrieve a map of that area which is stored in cartridge 47. As shown in FIG. 5, the map may then be displayed on display 24 and referred to by the pager user.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of using a pager and paging system comprising the steps of:
   receiving with said paging system a request from said pager for tourist information;
   determining an approximate location of said pager by identifying a base station of said paging system which most strongly receives a signal from said pager;
   preparing tourist information specific to said location; and
   transmitting only said specific information to said pager.

2. A method as claimed in claim 1, further comprising the step of translating said tourist information into another language.

3. A method as claimed in claim 1, wherein said tourist information comprises an indication of a map of said location and said method further comprises the step of transmitting said indication to said pager.

4. A method as claimed in claim 1, wherein said specific information comprises a list of tourist attractions at said location.

5. A method as claimed in claim 4, further comprising the steps of:
   receiving from said pager a selection from among said list of tourist attractions; and
   transmitting information about said selected attraction to said pager.

6. A method as claimed in claim 4, further comprising the steps of:
   receiving from said pager a selection from among said list of tourist attractions; and
   transmitting directions from said selected attraction to another of said listed attractions.

7. A method of conducting a tour comprising transmitting a predetermined sequence of information about and directions between tourist attractions to a pager in response to signals transmitted by said pager;
   wherein, prior to said transmitting, said method comprises determining a location of said pager by identifying a base station which most strongly receives a signal from said pager; and
   wherein, after said determining, said method comprises transmitting to said pager a listing of tourists attractions within a predetermined distance of said location;
   receiving from said pager a selection from among said listing; and
   beginning said transmitting a predetermined sequence of information about and directions between tourist attractions with said selected tourist attraction.

8. A method as claimed in claim 7, further comprising translating said information and directions into a particular language using a language cartridge which is inserted in a cartridge port of said pager.

9. A method as claimed in claim 8, wherein said translating is accomplished by storing in said cartridge said sequence of information and directions translated into said particular language.

10. A method of directing tourists comprising:
    determining a general location of a pager by identifying a base station which most strongly receives a signal from said pager;
    transmitting to said pager a locator signal indicative of said location of said pager;
    retrieving map data based on said locator signal;
    displaying on said pager a map from said map data, wherein said map includes said location of said pager.

11. A method as claimed in claim 10, wherein said retrieving comprises:
    inserting a map cartridge in which map data is stored into a cartridge port of said pager; and
    retrieving said map data from said map cartridge with a processor of said pager.

\* \* \* \* \*